United States Patent [19]

Fox

[11] Patent Number: 4,614,185

[45] Date of Patent: Sep. 30, 1986

[54] PISTON ENGINE HAVING A PHOSPHATIZED CYLINDER WALL

[75] Inventor: Richard C. Fox, Mobile, Ala.

[73] Assignee: Teledyne Industries, Inc., Los Angeles, Calif.

[21] Appl. No.: 727,864

[22] Filed: Apr. 26, 1985

Related U.S. Application Data

[63] Continuation-in-part of Ser. No. 547,849, Nov. 2, 1983, abandoned.

[51] Int. Cl.$^4$ ............................................. F02B 75/08
[52] U.S. Cl. .................................. 123/668; 123/193 C
[58] Field of Search ........ 123/193 R, 193 H, 193 CH, 123/193 C, 657, 668, 669

[56] References Cited

U.S. PATENT DOCUMENTS

| | | | |
|---|---|---|---|
| 1,825,769 | 10/1931 | Barbarou | 123/193 CH |
| 1,867,795 | 7/1932 | Angle | 123/193 CH |
| 2,926,649 | 3/1960 | Hicks | 123/668 |
| 3,019,277 | 1/1962 | Rudy | 123/668 |

FOREIGN PATENT DOCUMENTS 61954 12/1982 Japan .............................. 123/193 C Primary Examiner—Craig R. Feinberg
Attorney, Agent, or Firm—Gifford, Groh, VanOphem, Sheridan, Sprinkle & Dolgorukov

[57] ABSTRACT

A method for constructing and breaking in piston engines includes applying an integral phosphate layer to the interior cylinder wall prior to the insertion of the piston into a cylinder. The invention includes the improved engine so constructed. The phosphate layer decreases oil consumption and improves piston ring seating in such an engine. The phosphatizing solution includes a zinc or manganese salt in phosphoric acid at a pH between about 2.5 and 4.

7 Claims, 1 Drawing Figure

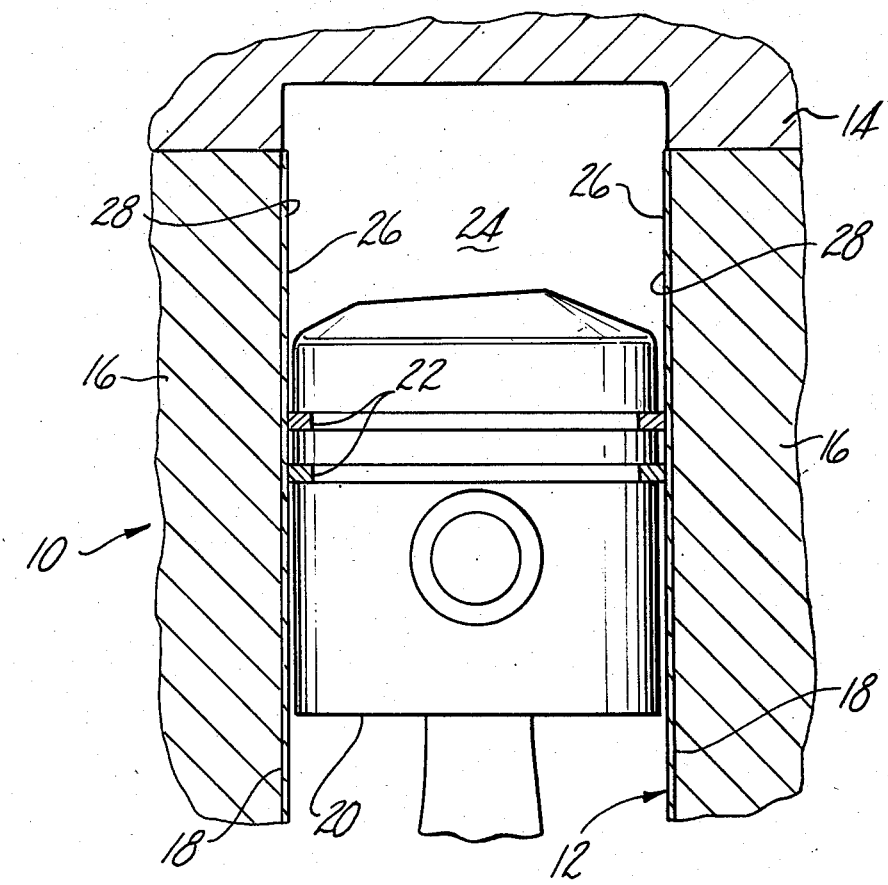

ical combustion engines, typically comprise a multiplicity of cylinder assemblies. These cylinder assemblies conventionally comprise at least one cylinder head and at least one steel cylinder attached to the head. Because the weight of the engine is a significant factor for the overall performance and efficiency of the engine, attempts are often made to reduce the overall weight of the engine. In aircraft engines, for example, the cylinder head or heads are often constructed of aluminum, or an aluminum or other alloy. For various reasons, steel remains the material of choice for the cylinder itself.

PISTON ENGINE HAVING A PHOSPHATIZED CYLINDER WALL

CROSS REFERENCE

This is a continuation-in-part application of Ser. No. 547,849, filed November 2, 1983 now abandoned.

BACKGROUND OF THE INVENTION

I. Field of the Invention

The present invention is directed to piston engines, and more particularly, to aircraft engines having a rust-resistant cylinder wall with superior piston ring seating properties.

II. Description of the Prior Art

Piston engines, and in particular internal combustion engines, typically comprise a multiplicity of cylinder assemblies. These cylinder assemblies conventionally comprise at least one cylinder head and at least one steel cylinder attached to the head. Because the weight of the engine is a significant factor for the overall performance and efficiency of the engine, attempts are often made to reduce the overall weight of the engine. In aircraft engines, for example, the cylinder head or heads are often constructed of aluminum, or an aluminum or other alloy. For various reasons, steel remains the material of choice for the cylinder itself.

One problem with the steel cylinders conventionally used in aircraft engines is that the cylinders are susceptible to rust or rust-type corrosion of the cylinder bores, especially during storage or during the first few hours of operation of the engine. The problem is particularly acute when the engine is run briefly, for example, after assembly, and then allowed to sit idle for some period of time. If this corrosion is allowed to develop, pits may be formed in the cylinder barrel surface. This corrosion is sometimes severe enough to adversely effect piston ring wear and oil control.

There are, of course, several ways of inhibiting rust formation on a steel surface, but the nature of the cylinder assembly or aircraft engines renders these ways less than useful. Painting the cylinder walls may interfere with the sealing function of the piston rings, and can be abraded from the wall during the first few hours of operation. Provision of an oxide coating on the cylinder barrels may not be possible, because of the nature of typical aircraft engine manufacturing procedures. One of the first steps assembling an engine is to assemble the steel cylinder or cylinders to the aluminum cylinder head. The chemicals employed in creating an oxide layer on the barrel surface are often corrosive to aluminum, and their use is therefore prohibited.

The application of a layer of crystalline phosphate to a ferrous surface is known, for example, to a steel engine combustion chamber head, as in U.S. Pat. No. 3,082,128 to Craig. Craig disclosed phosphatizing the combustion chamber head for the purpose of reducing carbon buildup in the head during operation of the engine. But no reference has been found in which the cylinder barrel, and in particular the cylinder wall, has been phosphatized.

Moreover, as noted by Blum et al in U.S. Pat. No. 3,297,493, at column 1, lines 28 through 33, phosphate-type coatings are usually characterized as being relatively fragile. A phosphorous coating on a cylinder wall could be expected to wear away during operation of the engine, under the abrasive friction of the piston rings, or could be expected to adversely effect piston ring wear.

The potential for interference with the sealing function of the piston rings could also be expected from such a coating.

SUMMARY OF THE PRESENT INVENTION

The present invention overcomes these and other problems by providing an engine having a cylinder assembly which is rust resistant and also has superior wear and sealing characteristics. The cylinder assembly comprises an aluminum cylinder head and a steel cylinder barrel attached thereto. The surface of at least the interior cylinder wall is converted to an integral layer of crystalline phosphate subsequent to the attachment of the cylinder barrel to the cylinder head.

The phrase "integral layer of crystalline phosphate" means the layer existing on a ferrous cylinder wall surface subsequent to treatment by either the phosphatizing method described hereinafter, or any other phosphatizing method now known or hereafter discovered. The phosphatizing method employed in the present invention preferably comprises: rendering the aluminum cylinder head inert to phosphatizing; attaching a steel cylinder to it; and applying a solution of water, zinc and phosphoric acid to the cylinder assembly so formed. Manganese can be employed in the solution instead of zinc.

The process for constructing the engine includes attaching at least one steel cylinder to each of at least one cylinder head, applying the aforesaid phosphatizing solution to the cylinder assembly so formed, and inserting a piston and its associated piston ring into each of said at least one cylinder. The process of breaking in an engine includes the steps of constructing an engine, in accordance with the previously described steps and then controlling the operation of the engine during its period of initial use.

BRIEF DESCRIPTION OF THE DRAWING

A better understanding of the present invention will be had upon reference to the following detailed description, when read in conjunction with the accompanying drawing, in which the FIGURE is a partial cross-sectional block diagram of the preferred embodiment of the present invention.

DETAILED DESCRIPTION OF THE PREFERRED EMBODIMENT OF THE PRESENT INVENTION

A piston engine 10 according to the present invention has at least one cylinder assembly 12, each of which comprises a cylinder head 14 having at least one steel cylinder 16 attached to it. Subsequent discussion of the engine and processes of the present invention will be restricted to the example of an aircraft engine comprising a multiplicity of cylinder assemblies, each assembly consisting of an aluminum cylinder head attached to a single steel cylinder. It should be clear that the utility of the present invention is not limited to this type of engine, however, but can be employed in an engine having one or more cylinder heads, each cylinder head having one or more cylinders attached to it.

One of the first steps in constructing an aircraft engine is the assembly of the steel cylinder 16 to the aluminum cylinder head 14. The cylinder assembly 12 so constructed is subject to subsequent manipulative steps, for example, the honing of a cylinder wall 18. The interior diameter of the cylinder 16 is slightly larger than the diameter of a piston 20 to be inserted therein, during subsequent engine construction. The piston 20 bears at least one piston ring 22 thereon which is intended to operatively seal a combustion chamber 24 created by the cylinder wall 12, the cylinder head 14, and the piston 20.

The novel feature in the engine construction and processes of the present invention is the provision of an integral layer of crystalline phosphate 26 upon an inner steel cylinder wall surface or bore 28. This layer 26 is provided as follows:

1. The aluminum cylinder head 14 is separately rendered inert to phosphatizing, preferably by providing it with a chromate conversion coating as is known in the art. Alternatively, the head 14 can be rendered inert by anodizing or by another method.

2. The steel cylinder 16 is attached to the aluminum cylinder head 14 to form a cylinder assembly 12. This assembly is honed and washed subsequent to this attachment. Preferably, this washing comprises brush scrubbing the cylinder bore 26 using an aqueous detergent solution. Any detergent, soap or cleaning solution or fluid which does not corrode the cylinder assembly 12 and does not leave a residue thereon will be useful. Organic or hydrocarbon solvent based cleaning fluids are useful for this purpose. The concentration of the cleaning solution or fluid should be sufficient to render the cylinder bore free of contaminants. Preferably, the detergent solution comprises an aqueous solution two (2) ounces of Ridoline No. 53 (a proprietary product of Amchem Products, Inc.), or equivalent, per gallon of water, at about 150° F. Turco Plaudit Cleaner (a proprietary product of Turco Products, a division of Purex Corporation) is such an equivalent. A preferred solvent based cleaning fluid, Parko Preclean No. 2978 (a proprietary product of Parker Chemical Company), is typical of the fluids useful in brush washing the cylinder assembly 12.

3. (a) If storage or transportation of the cylinder assemblies 12 is desired, the cylinder assemblies 12 can be preserved by the application of an oil thereto. Preferably, an oil conforming to Military Specification VV-L-800 is applied to the inside diameter of the cylinder bore 28, although other oils may be substituted.

(b) The preserving oil must be removed from the cylinder assembly 12 prior to subsequent treatment of the cylinder assemblies. Any detergent, soap or cleaning solution or fluid which does not corrode the cylinder assembly 12 and does not leave a residue thereon, and sufficiently removes the preserving oil so that the oil does not interfere with the phosphatizing steps, will be useful. The preferred preserving oil can be preferably removed by immersion of the cylinder assembly 12 for about five (5) minutes in an aqueous solution comprising about four to six (4–6) ounces of Ridoline No. 53, or an equivalent cleaner (such as Parko Cleaner No. 2033), per gallon of water at about 150° to about 160° F. The oil removing solution can alternatively be applied by a multiple stage power cleaner or by some other means.

(c) Preferably, when a water based or water soluble cleaner is employed, the cylinder assembly 12 is thoroughly rinsed in cold water subsequent to the washing step.

4. The cleaned cylinder assembly 12 is then immersed in a phosphatizing solution for a sufficient period of time in order to produce a uniform gray crystalline layer on the assembly. Preferably, the solution comprises at least one zinc salt in a phosphoric acid solution at a pH of about 2.8 to 3.0, which is maintained at a temperature of about 155° to about 170° F. The phosphatizing solution can also contain one or more accelerators, such as nickel, calcium, certain well-known nitrite compounds, or the like. A preferred concentrate for the phosphatizing solution is Turco 4333, a propriety product of Turco Products, which is a division of Purex Corporation. A three (3%) percent aqueous solution of Turco 4333 will be expected to provide a phosphate layer of about one thousand (1,000) milligrams per square foot of surface area, when the assembly is immersed for about five (5) to eight (8) minutes.

5. The cylinder assembly 12 is then rinsed in water, to terminate the phosphatizing of the cylinder bore 28. This rinse is preferably a hot water rinse at about 180° F., and can incorporate a chromating agent as a coating sealer, to further improve the quality and performance of the coating. The cylinder assembly 12 is then preferably air dried, if it is to be painted after phosphatizing. Alternatively, the rinse can be a cold water rinse. The cylinder 12 is subsequently preferably oil preserved as described below.

6. The cylinder assembly 12 can be oil preserved by the application thereto of a solution of a water soluble oil at room temperature. Such application can be by spraying or immersion, as is convenient. Preferably the water soluble oil solution contains about ten (10%) percent by volume of Turco 4454, a water soluble oil which is a proprietary product of Turco Products, a division of Purex Corporation. Resist-X (a proprietary product of National Chem-Search) is another water soluble oil which is useful for this purpose.

Other phosphatizing concentrates are also useful in the present invention. Bonderite 880 (a proprietary product of Parker Chemical Co.) and Turco 3797 are zinc-phosphoric acid solutions which can replace the Turco 4333 concentrate in the process above. Alternatively, the phosphatizing solution can comprise at least one manganese or other salt in a phosphoric solution at a pH of about 2.5 to 4.0. The only modification to the above process is that, when a manganese phosphoric acid solution is employed, the phosphatizing bath is preferably maintained at a temperature between about 155° F. to 195° F. Manganese concentrates which can provide such a solution include Parko Lubrite No. 2, Parko Lubrite No. 5, and Thermoil-Granodine 112 (a product of Amchem Products, Inc.). Each of the zinc and manganese concentrates listed above possess a concentration such that a three percent (3%) aqueous solution of each of them is expected to provide a phosphate layer of about one thousand (1,000) milligrams per square foot of surface area, when the cylinder assembly is immersed for about five (5) to eight (8) minutes. Of course, in light of this disclosure, one skilled in the art should be able to select other phosphatizing concentrates which will achieve the same effects.

The engine 10 according to the present invention incorporates the cylinder assembly 12 prepared in accordance with this procedure. This engine, when so constructed, exhibits unusual and unexpected properties. The integral layer of crystalline phosphate 28 is resistant to the abrasive wear from the piston ring 22, in contrast to the expectation that the relatively soft phosphate layer would be easily worn away. Instead, the phosphate crystals remain visible on inspection of the interior cylinder wall 18 after a substantial period of operation of the engine so constructed. The entire portion of the cylinder wall within the ring travel area typically exhibits a visible phosphate layer for at least one hundred (100) hours of operation. After about two hundred (200) hours of engine operation, phosphate crystals will typically remain visible in valleys and grooves of the crosshatch pattern within the ring travel area. Additionally, the engine constructed according to the present invention has superior oil consumption characteristics and improved piston ring seating during break-in because of this phosphate layer. The beneficial effects of the treatment described herein are expected to last throughout the life of an engine so constructed.

Another embodiment of the present invention is an improvement in the methods of breaking in engines. Breaking in methods conventionally comprise engine assembly and then the controlled use of the engine for some defined period of time. The improvement in those methods comprises the step of creating an integral layer of crystalline phosphate on the cylinder wall prior to the assembly of the engine. More specifically, the improvement comprises creating such a layer prior to the insertion of the engine piston(s) into the cylinder(s) so treated. The creation of the phosphate layer preferably occurs as previously described.

The present invention thus provides an engine having a rust resistant cylinder assembly, which also has improved piston ring seating and oil consumption characteristics. The invention having been described, however, many modifications thereto will become apparent to those skilled in the art to which it pertains without deviation from the spirit of the invention as defined by the scope of the appended claims.

What is claimed is:

1. A piston engine comprising:
   at least one cylinder head;
   at least one steel cylinder attached to each of said at least one cylinder head, said at least one steel cylinder having an interior cylinder wall and a surface on said wall;
   a piston disposed in each of said at least one steel cylinder; and
   a piston ring disposed between said piston and said cylinder wall coacting against said surface;
   wherein said cylinder wall bears means for inhibiting rust while reducing oil consumption during long term operation of the engine comprising an integral layer of crystalline phosphate on said surface.

2. The invention according to claim 1, wherein said surface of said cylinder head is maintained free from corrosion due to creation of said integral layer of crystalline phosphate.

3. The invention according to claim 1, wherein said engine is an aircraft engine.

4. The invention according to claim 1, wherein said integral layer of crystalline phosphate is characterized by resistance to wear by said piston ring during operation of said engine.

5. The invention according to claim 1, wherein said integral layer is of the type assisting the seating of said piston ring in said cylinder.

6. The invention according to claim 1, wherein said cylinder head is an aluminum cylinder head.

7. The invention according to claim 6, wherein said aluminum cylinder head bears a chromate conversion coating thereon.

* * * * *